United States Patent [19]

Inaba et al.

[11] 4,040,981
[45] Aug. 9, 1977

[54] PROCESS FOR PRODUCING DENITRATING CATALYSTS

[75] Inventors: Hideya Inaba; Masayoshi Ichiki; Yoshinori Wakiyama, all of Osaka, Japan

[73] Assignee: Hitachi Shipbuilding & Engineering Co., Ltd., Osaka, Japan

[21] Appl. No.: 699,472

[22] Filed: June 24, 1976

[30] Foreign Application Priority Data

June 30, 1975 Japan .................................. 50-81339

[51] Int. Cl.$^2$ ........................ B01J 21/04; B01J 23/74; B01J 23/86
[52] U.S. Cl. ................................... 252/463; 252/465; 252/466 J; 427/376 H; 427/383 D
[58] Field of Search ................ 252/466 J, 477 Q, 463, 252/465; 29/196.2, 197; 156/3, 22; 427/376 H, 383 D

[56] References Cited

U.S. PATENT DOCUMENTS

| 2,970,065 | 1/1961 | Greene et al. ................... 427/383 D |
| 3,294,653 | 12/1966 | Keller et al. ....................... 156/22 X |
| 3,846,344 | 11/1974 | Larson et al. ..................... 252/477 Q |

*Primary Examiner*—W. J. Shine

[57] ABSTRACT

A denitrating catalyst is produced by plating the surface of unactivated metal with aluminum and immersing the resulting layered product in an aqueous aluminum-dissolving solution to dissolve out the aluminum into the aqueous solution and to thereby activate the surface of the metal.

11 Claims, 6 Drawing Figures

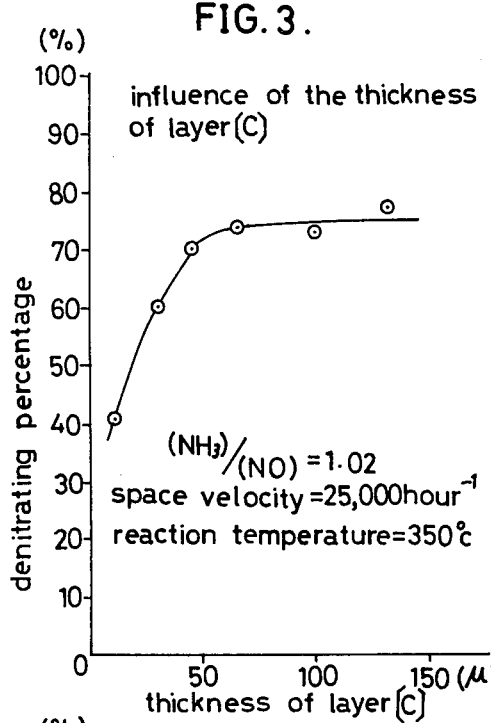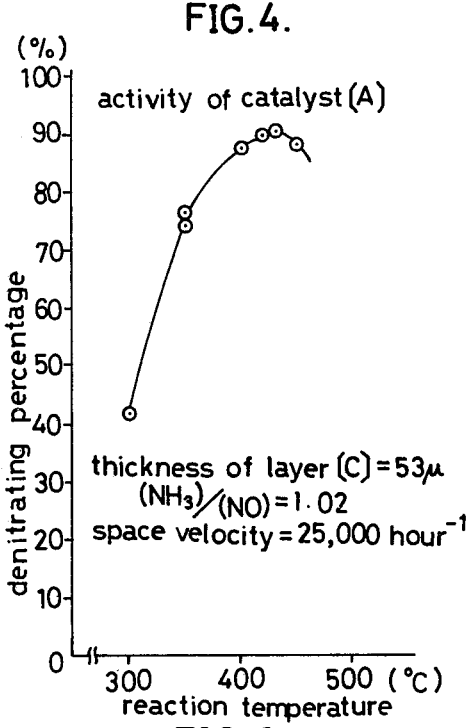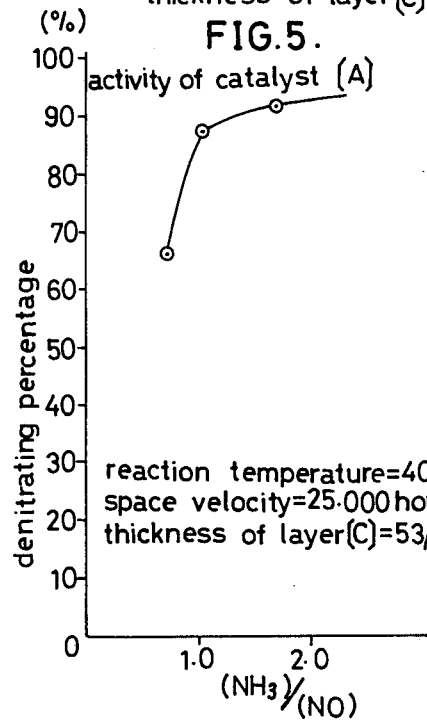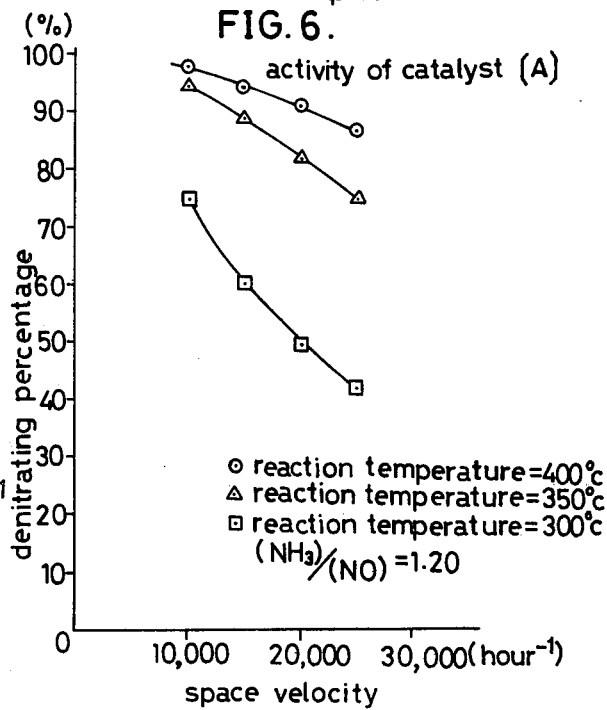

PROCESS FOR PRODUCING DENITRATING CATALYSTS

BACKGROUND OF THE INVENTION

The present invention relates to a process for producing denitrating catalysts, and more particularly to a process for producing catalysts for use in reactions for selectively catalytically reducing nitrogen oxides with ammonia.

In recent years, much attention has been directed to measures for treating nitrogen oxides which are discharged into the atmosphere from various chemical plants, motor vehicles, etc. since such oxides are said to be responsible for photochemical smog.

Methods of removing nitrogen oxides have heretofore been proposed which include a method of catalytically reducing nitrogen oxides by using ammonia as a reducing agent. This method is thought to be advantageous in that ammonia reacts selectively with nitrogen oxides for example as represented by the following equations even if the exhaust gas contains above 1% by volume of oxygen.

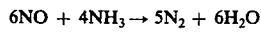

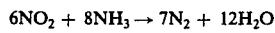

Known catalysts used in this method are those composed of alumina, silica or like carrier and metal such as copper, iron or nickel supported by the carrier. However, because these catalysts are used in the form of particles, they have the disavantages of involving a great pressure loss, being unusable for the treatment of exhaust gases having an especially high dust concentration and necessitating a complicated replacement procedure. Catalysts comprising an active alumina carrier have another problem in that the active alumina is progressively converted to a sulfate and consequently inactivated by the sulfuric anhydride ($SO_3$) and the like present in a very small amount in the exhaust gas.

SUMMARY OF THE INVENTION

It is an object of the invention to provide a process for producing denitrating catalysts by a relatively simple procedure wherein catalysts are free of the foregoing disadvantages and have outstanding activity.

According to the present invention, a process for producing a denitrating catalyst comprises a first step of plating the surface of unactivated metal with aluminum and a second step of immersing the resulting layered product in an aqueous aluminum-dissolving solution to dissolve out the aluminum into the aqueous solution and to thereby activate the surface of the metal.

The unactivated metals useful in the first step are single metals or alloys which, when activated, exhibit catalytic activity in a reaction for selectively catalytically reducing nitrogen oxides with ammonia. Examples of such metals are pure iron; iron-base alloys such as stainless steel and nickel steel; nickel-base alloys such as Monel metal, permalloys, Inconel and Nichrome; copper-base alloys such as chromium copper and bronze; etc.

The surface of the unactivated metal is first plated with aluminum by, for example, hot dipping, cementation, vacuum plating, spray coating or like usual plating method. The plating treatment forms an aluminum layer on the surface of the unactivated metal, permitting the unactivated metal and aluminum to diffuse in each other in solid phase and consequently producing a layer in which the metal has been diffused in the aluminum plating layer and a layer in which the aluminum has been diffused in the metal.

When required, the layered product plated with aluminum is subjected to heat treatment at a temperature not lower than the melting point of aluminum (about 660° C) to increase the thicknesses of the diffusion layer. The thickness of the layer containing the aluminum diffused in the unactivated metal greatly influences the activity of the resulting catalyst. If the thickness of the layer is smaller than 50 $\mu$, the catalytic activity gradually reduces with decreasing thickness, and with thicknesses less than 30 $\mu$, markedly reduced activity will result (see FIG. 3).

In the second step, the layered product obtained from the first step is immersed in an aqueous solution capable of dissolving aluminum such as an aqueous solution of acid or alkali. Useful acids are, for example, hydrochloric acid, nitric acid and like mineral acids, and acetic acid, formic acid and like organic acids. Examples of useful alkalis are sodium hydroxide and like alkali metal hydroxides, alkali metal carbonates, alkaline earth metal hydroxides, etc. It is especially preferable to use an aqueous solution of hydroxide. When immersed in the aqueous solution, the aluminum dissolves out into the solution, rendering the surface of the unactivated metal porous and catalytically active for denitration.

This invention will be described below in greater detail with reference to the accompanying drawings.

BRIEF DESCRIPTION OF THE DRAWINGS

FIG. 3 is a graph illustrating the relation between the thickness of layer C in FIG. 1 and denitrating percentage; and FIGS. 4 to 6 are graphs illustrating the activity test results of catalyst (b) produced in Example 1.

DESCRIPTION OF THE PREFERRED EMBODIMENTS

Figure 1:
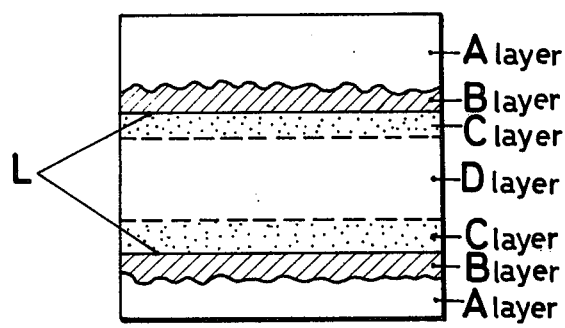
FIG. 1 is a sectional view showing an aluminum-plated layered product resulting from the first step of the process of this invention.
Figure 2:
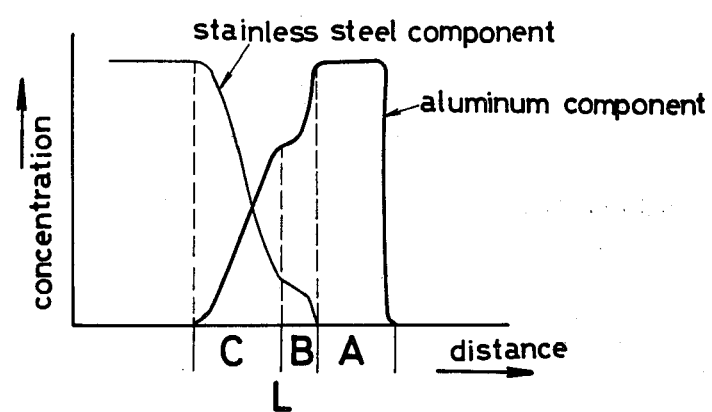
FIG. 2 is a graph illustrating the relation between the composition of the aluminum-plated product and distance.

A stainless steel panel is first plated with aluminum on its opposite surfaces. FIG. 1 shows the resulting layered product in cross section. The product includes layers A which are aluminum layers, layers B in which stainless steel is diffused in aluminum, layers C in which aluminum is conversely diffused in stainless steel, a layer D which is a stainless steel layer and interfaces L between aluminum and stainless steel. FIG. 2 is a graph illustrating the proportion of aluminum and stainless steel composing the layered product as determined by analyzing the product by an X-ray microanalyzer. In the graph the distance from the center of the width of the layer D in FIG. 1 to the surface of the layer A in FIG. 1 is plotted as abscissa vs. the concentrations of stainless steel and aluminum as ordinate. The aluminum-plated stainless steel panel is subsequently immersed in an aqueous solution of sodium hydroxide. This step may be practiced preferably under mild conditions. When the panel is immersed in the aqueous solution, the aluminum is selectively dissolved out into the solution as represented by the following equation.

$$2Al + 2NaOH + 2H_2O \rightarrow 2NaAlO_2 + 3H_2$$

Consequently the aluminum of the layers A is first dissolved out, and the aluminum component in the diffusion layers B is then dissolved out. The time when the aluminum starts to dissolve out from the layers B is dependent on the thickness of the layers A, the condition of local aluminum oxide film and variations in the size of crystalline particles and therefore may vary from position to position in the layer B. The aluminum component is selectively dissolved out from the layers B into the solution, leaving the stainless steel as diffused in the layers. The dissolving further proceeds and the planes of dissolving out advance into the diffusion layers C beyond the interfaces L between the aluminum and stainless steel. The time when the dissolving plane reaches the interface L may also vary from position to position in the layer B. Since the aluminum content of the diffusion layer C is lower than those of the layers A and B, the aluminum invariably dissolves out from the layer C at a much lower velocity than from the layers A and B. Thus even if the time for the dissolving-out plane to reach the layer C differs from position to position in the layer B, a delayed dissolving-out plane will catch up, within the layer C, with a preceding dissolving-out plane. Within the layer C, therefore aluminum dissolves out substantially simultaneously.

Incidentally the aluminum in the layer C need not be dissolved out completely, but when at least 50% of the aluminum has been dissolved out, a sufficiently active catalyst will be obtained.

When the aluminum has been dissolved out, the remaining stainless steel assumes porous surfaces and becomes catalytically active.

The activated stainless steel product resulting from the immersion treatment is washed with water and dried. The washing procedure removes almost all the porous portion (layers B) of the stainless steel. If part of the porous portion still remains after washing, it is preferably fully scraped off by a suitable procedure, since the porous portion will be released as dust which is undesirable as a health hazard when the catalyst is being packed for use.

The catalyst produced by the method of this invention exhibits high activity in reactions such as the oxidation of carbon monoxide and reduction of nitrogen oxides with carbon monoxide and hydrogen in a reducing atmosphere, even at a high reaction temperature of above 200° C. However, when used for the selective catalytic reduction of nitrogen oxides with ammonia in an oxidizing atmosphere at such a high temperature, the catalyst permits decomposition and oxidation of the ammonia, further entailing more marked decomposition and oxidation of the ammonia at a higher temperature of above 250° C and consequently reducing the nitrogen oxide removal efficiency. Furthermore even in the temperature range of 150° to 200° C, the catalyst permits the decomposition and oxidation of ammonia to some extent and therefore necessitates use of a slight excess of ammonia relative to nitrogen oxides. Accordingly although the catalyst is active as a denitrating catalyst at a suitably selected temperature, it is preferable to treat the catalyst by contact with a gas containing sulfurous acid gas under the following conditions to render the catalyst active at a high temperature without permitting the catalyst to cause decomposition and oxidation of ammonia.

Treating conditions
Temperature: 200° to 400° C.
Contact gas: Gas containing at least 100 ppm of sulfurous acid gas.
Space velocity: At least 1,000 hour$^{-1}$.
Contact time: At least 3 hours.

The effect given by this treatment is hardly influenced by the possible presence of oxygen, water, nitrogen oxides and combustible substances in the contact gas as well as by the concentration thereof. Preferably the concentration of sulfurous acid gas is at least 100 ppm. The treating conditions are suitably selected within the above-mentioned ranges. For example when the contact gas has a low temperature and a low sulfurous acid gas concentration, a prolonged contact time should be selected. When the exhaust gas itself to be treated contains at least 100 ppm of sulfurous acid gas, the above-mentioned treatment need not be carried out since the untreated catalyst can then invariously come into contact with the sulfurous acid gas.

Although this invention has been described above specifically with respect to stainless steel, catalysts of this invention can be similarly prepared with use of other metals or alloys.

EXAMPLE 1

One-inch Paul rings made of Sus 304 (JIS) were immersed in molten aluminum at 720° C for 30 seconds to plate the surface of the rings with aluminum. The rings are thereafter heated at 720° C for 3 hours in a hydrogen gas atmosphere. The rings thus treated had layers C 53 μ in thickness. The rings were thereafter immersed in 10 wt. % aqueous solution of sodium hydroxide for 3 hours to dissolve out the aluminum. The stainless steel rings activated as above were washed with water and dried to obtain a catalyst (a), which was contacted with a gas containing 3% of oxygen, 500 ppm of sulphurous acid gas and 3% of water at 300° C for 5 hours. The catalyst (b) thus prepared was tested for activity under the following conditions. The results are given in FIGS. 4 to 6. FIG. 4 shows the relation between the reaction temperature and denitration percentage under the conditions of: NH$_3$/NO=1.02 and exhaust gas space velocity = 25,000 hour$^{-1}$. FIG. 5 shows the relation between the value of NH$_3$/NO and the denitration percentage under the conditions of space velocity of 25,000 hour$^{-1}$ and reaction temperature of 400° C. Further FIG. 6 shows the relation between the space velocity and the denitration percentage at NH$_3$/NO=1.20 and at reaction temperatures of 400° C, 350° C and 300° C.

EXAMPLE 2

Paul rings of varying materials were treated in the same manner as in Example 1 to produce catalysts, which were tested for activity. The result are listed below.

| Material of catalyst (JIS standards) | Conditions of heating after plating | | Denitration achieved at space velocity of 25,000 hr.$^{-1}$ and 300° C (%) |
|---|---|---|---|
| | Time (hrs) | Temp. (° C) | |
| Sus 430 | 3-5 | 700 | 25 |
| Sus 316 | 3 | " | 48 |
| Sus 316JI | 3 | " | 50 |
| 80% Nichrome | 5 | 750 | 50 |
| Pure iron | 2 | 700 | 40 |
| SS 41 | 2 | " | 42 |
| Monel metal | 3 | 750 | 48 |
| Inconel 600 | 3 | " | 40 |

| Material of catalyst (JIS standards) | Conditions of heating after plating Time (hrs) | Temp. (° C) | Denitration achieved at space velocity of 25,000 hr.$^{-1}$ and 300° C (%) |
| --- | --- | --- | --- |
| Inconel 800 | 3 | " | 40 |
| Sus 304 | — | — | 20 |
| Pure iron | — | — | 15 |

What is claimed is:

1. A process for producing a denitrating catalyst comprising the steps of plating the surface of unactivated metal with aluminum to form a first layer containing the metal diffused in the aluminum and a second layer containing the aluminum diffused in the metal, immersing the resulting layered product in an aqueous aluminum-dissolving solution to dissolve out the aluminum into the aqueous solution, and contacting the metal from which all or part of the aluminum is dissolved out with a gas containing sulfurous acid gas to thereby activate the surface of the unactivated metal.

2. A process as defined in claim 1 wherein the unactivated metal is a metal selected from the group consisting of pure iron, stainless steel and nickel-base alloys.

3. A process as defined in claim 1 wherein the aqueous aluminum-dissolving solution is an aqueous acid solution.

4. A process as defined in claim 3 wherein the aqueous acid solution is an aqueous solution of an acid selected from the group consisting of hydrochloric acid, nitric acid, acetic acid and formic acid.

5. A process as defined in claim 1 wherein the aqueous aluminum-dissolving solution is an aqueous alkali solution.

6. A process as defined in claim 5 wherein the aqueous alkali solution is an aqueous solution of hydroxide.

7. A process as defined in claim 6 wherein the hydroxide is sodium hydroxide.

8. A process as defined in claim 1 wherein the layered product resulting from the aluminum plating step and including said first and second layers is heat-treated at a temperature of not lower than the melting point of aluminum to increase the thicknesses of the first and second layers.

9. A process as defined in claim 8 wherein the second layer has a thickness of at least 30 $\mu$.

10. A process as defined in claim 1 wherein at least 50% of the aluminum in the second layer is dissolved out.

11. A process as defined in claim 1 wherein the concentration of the sulfurous acid gas is at least 100 ppm.

* * * * *